Patented Jan. 6, 1942

2,269,217

UNITED STATES PATENT OFFICE 2,269,217

MIXED POLYVINYL ACETAL RESIN

James G. McNally and Russel H. Van Dyke, Rochester, N. Y., assignors to Eastman Kodak Company, Rochester, N. Y., a corporation of New Jersey No Drawing. Application January 29, 1938, Serial No. 187,718

12 Claims. (Cl. 260—73)

This invention relates to synthetic resins and more particularly to what can be called polyvinyl acetal resins in which the acetal linkages are formed from a plurality of aldehydes and/or cyclic ketones. More accurately, the resins of this invention can be called polyvinyl acetal resins in which the acetal linkages are formed from a plurality of aldehyde acetal groups and/or cyclic ketone acetal groups. This application is a continuation-in-part of our copending application Serial No. 47,472, filed October 30, 1935.

Simple polyvinyl acetal resins (i. e., those in which the acetal linkages are formed from but one kind of aldehyde acetal group or cyclic ketone acetal group) have been prepared from polyvinyl alcohols by condensation of aldehydes or cyclic ketones therewith, in the presence of an acetal condensation catalyst. Simple polyvinyl acetal resins have also been prepared by concomitantly deesterifying a polyvinyl ester and condensing the deesterified product with aldehydes, in the presence of a deesterification catalyst, the catalyst serving to accelerate also the condensation of the deesterified product with the aldehyde. The polyvinyl acetaldehyde acetal resins, prepared from polyvinyl alcohol and acetaldehyde, for example, are probably the most interesting of the simple polyvinyl acetal resins. These acetaldehyde acetal resins appeared to be useful for a variety of purposes in the plastics field. For example, these acetaldehyde acetal resins can be cast from ordinary simple solutions into the form of transparent film or sheet. However, the film or sheet is too brittle to be adapted commercially to certain uses; for instance, the film or sheet is too brittle to serve as a support for light-sensitive photographic coatings. Efforts to decrease the brittleness of such resins by changing the chemical composition thereof, viz., by increasing the hydroxyl group content, resulted in resins which were too water susceptible. Formaldehyde acetal resins have many properties desirable in plastic materials, but possess a peculiar affinity for the relatively few organic solvents in which they are soluble, which characteristic practically precludes their adaptation to a number of commercial processes. Butyraldehyde acetal resins are fairly thermoplastic substances, so that their use is considerably limited. Benzaldehyde acetals prepared by the prior art processes have very high softening points, relative to the aforesaid simple polyvinyl acetal resins, but have very limited solubilities in the usual organic solvents and hence are of limited utility.

We have now found a new group of polyvinyl acetal resins which possess new characteristics permitting the resins to be adapted commercially to a number of processes. In our new resins, the acetal linkages are formed from a plurality of aldehydes and/or cyclic ketones. By means of our invention, acetaldehyde acetal resins having greatly improved flexibility without loss of moisture resistance are made available, formaldehyde acetal resins having greatly improved solubility and solvent retention characteristics are provided and benzaldehyde acetal resins having improved solubilities in organic solvents are made available for the first time.

It is, accordingly, an object of our invention to provide new polyvinyl acetal resins. It is a further object of our invention to provide new polyvinyl acetal resins in which the acetal linkages are formed from a plurality of aldehyde acetal and/or cyclic ketone acetal linkages, which resins have characteristics permitting the adaptation of the resins to a variety of commercial processes. It is a further object of our invention to provide a process for preparing our new resins. Other more specific objects will become apparent hereinafter.

According to our invention, we prepare our new resins by treating a polyvinyl compound containing hydroxyl groups with a plurality of aldehydes and/or cyclic ketones, in the presence of an acetal condensation catalyst. We can employ a polyvinyl ester as a starting material and concomitantly deesterify the ester and condense the deesterified product with a plurality of aldehydes and/or cyclic ketones. Our new resins always contain a hydroxyl group content which is advantageously not in excess of that equivalent to about 15% by weight of polyvinyl alcohol. The ester group content, if any, of our new resins is advantageously not more than that equivalent to about 10% by weight of polyvinyl ester and is preferably 5% or less. Those of our new resins having sticking points, as determined by the metallic bar method, of at least about 120° C. are particularly useful in the plastics field.

A particularly useful group of our new resins, especially from the standpoint of manufacturing transparent film or sheet to be used as a support for light-sensitive photographic coatings, is that group in which the acetal linkages are formed from a plurality of aliphatic aldehyde acetal groups containing up to four carbon atoms, such as formaldehyde, acetaldehyde, chloracetaldehyde, propionaldehyde, butyraldehyde and isobutyraldehyde acetal groups, for example. Among such resins, the hydroxyl group content is advantageously not more than about that equivalent to 15% by weight of polyvinyl alcohol and is beneficially 10 to 7% by weight or less, and the ester group content, if any, is likewise advantageously not more than that equivalent to about 10% by weight of polyvinyl ester. Preferably, the ester group content is 5 to 1% or less. A very useful group of these resins wherein the acetal linkages are formed from a plurality of aldehyde acetal groups containing not more than four carbon atoms is made up of those in which from about 10 to about 50 mol. percent of the total acetal linkages are formed from propionaldehyde, butyraldehyde, and/or isobutyraldehyde acetal groups, while the remainder of the acetal linkages are formed from aldehyde acetal groups containing from one to two carbon atoms, such as formaldehyde, acetaldehyde or chloracetaldehyde acetal groups, for example. Acetaldehyde acetal resins in which from about 20 to about 40 mol. percent of the acetal linkages are formed from butyraldehyde or isobutyraldehyde acetal groups are particularly useful for the manufacture of the aforesaid support for photographic coatings and are the invention of Ralph H. Talbot (see a copending application Serial No. 85,733, filed June 16, 1936, now United States Patent 2,129,450, dated Sept. 6, 1938) and Donald R. Swan (see his copending application Serial No. 262,029, filed March 15, 1939).

Another particularly useful group of our new resins is made up of those in which from about 10 to about 30 mol. percent of the total acetal linkages are formed from aliphatic aldehyde acetal groups containing five or more carbon atoms and the remainder of the acetal linkages are formed from aldehyde acetal groups containing from one to two carbon atoms, such as formaldehyde, acetaldehyde or chloracetaldehyde acetal groups, for example. In this group of resins the hydroxyl group content is advantageously not more than that equivalent to about 10% by weight of polyvinyl alcohol, while the ester group content is likewise advantageously not more than that equivalent to about 10% of polyvinyl ester and is preferably 5% or lower. Resins of this group are also useful in the manufacture of transparent film or sheet intended as a support for photographic coatings. Still another particularly useful group of our new resins is made up of those in which from about 10 to about 50 mol. percent of acetal linkages are formed from aromatic aldehyde acetal groups and the remainder are formed from aromatic aldehyde acetal groups, particularly aliphatic aldehyde acetal groups having not more than four carbon atoms, such as formaldehyde, acetaldehyde, chloracetaldehyde, propionaldehyde, butyraldehyde, or isobutyraldehyde acetal groups, for example. Acetaldehyde-benzaldehyde acetal resins are particularly useful in the manufacture of transparent film or sheet intended as a support for light-sensitive photographic coatings. In these resins containing aromatic aldehyde acetal groups, the ester group content is advantageously not greater than that equivalent to about 10% by weight of polyvinyl ester and is preferably 5 to 1% or less. The hydroxyl group content is advantageously not more than that equivalent to about 12 to 15% by weight of polyvinyl alcohol and is beneficially 8% or less.

While the process of making our new resins is subject to variation, particularly as respects the nature and quantity of the starting polyvinyl compound employed, the nature and quantity of the aldehyde or cyclic ketone employed, the nature and quantity of the acetal condensation catalyst employed, the nature and quantity of the deesterification agent employed, if any, the nature and quantity of deesterification catalyst employed, if any, and the method of isolation and purification of the resins, the following examples will serve to illustrate the mode of obtaining our new resins. These examples are not intended to limit our invention. In the examples, the degree of polymerization of the polyvinyl ester employed is indicated by stating the viscosity in centipoises of its 10% solution in benzene at 25° C.

EXAMPLE 1.—*Polyvinyl formaldehyde-acetaldehyde acetal resins*

Into each of four glass stoppled containers were placed 50 gms. of a polyvinyl acetate (30 centipoises), and, to each container were added 62 cc. of ethyl alcohol (95%), 15 cc. of water and 2 cc. of hydrochloric acid (sp. g. 1.18). When most of the lumps were dissolved, there was added various mixtures of trioxymethylene (polymeric formaldehyde) and paraldehyde (polymeric acetaldehyde) as shown below. Each was stirred thoroughly before placing in an oven maintained at 70° C.

1a. 12 gms. of trioxymethylene and 4.4 gms. of paraldehyde were added. Heating at 70° C. was effected for 48 hours. At the end of this time, the resin was precipitated in hot water, washed and dried. Yield 27 gms. Soluble in a mixture of ethylene dichloride (75%) and methyl alcohol (25%). This resin was converted into a clear film which was characterized by its low water susceptibility and resistance to scratching. This resin had an acetate group content equivalent to about 3.7% by weight of polyvinyl acetate and a hydroxyl group content equivalent to about 12.1% by weight of polyvinyl alcohol.

1b. 9 gms. of trioxymethylene and 8.8 gms. of paraldehyde were added. Heating at 70° C. was effected for 48 hours. The resin was precipitated in hot water, washed and dried. Yield 28 gms. Soluble in mixtures of ethylene dichloride and methyl alcohol. This resin was converted into a film characterized by its excellent clarity and the ease with which it could be stripped from the film-forming surface.

1c. 6 gms. of trioxymethylene and 13.2 gms. of paraldehyde were added. Heating was effected at 70° C. for 48 hours. The resin was precipitated in hot water, washed and dried. Yield 30 gms. Soluble in mixtures of ethylene dichloride and methyl alcohol. This resin was converted into a film characterized by its excellent clarity and low water susceptibility.

1d. 3 gms. of trioxymethylene and 17.6 gms. of paraldehyde were used. Yield 29 gms. Soluble in mixtures of ethylene dichloride and methyl alcohol. This resin was converted into a film characterized by its excellent clarity and high resistance to tear.

Any of the above four procedures can be duplicated employing as starting material, a compound which already has a substantial hydroxyl group content, for example, a partially or substantially completely hydrolyzed polyvinyl acetate. In these above procedures and in the following examples, the reagents employed, such as ethyl alcohol, trioxymethylene, paraldehyde, etc., need not be highly purified substances, the commercial grades of materials usually sufficing. Of course, very impure reagents should be avoided. In precipitating any of these new resins, it is advisable to avoid rapid precipitation in the form of a compact mass. A convenient method of precipitation is to allow a very small stream of the reaction mixture to flow into water. Precipitation occurs in the form of a thread which presents a large area to the water and permits the contaminating acid, alcohol and unreacted trioxymethylene to be washed out. Precipitation in hot water facilitates this washing out of impurities. The precipitation can also be carried out in dilute ammonium hydroxide. Even when the thread method of precipitation is employed, the thread-like precipitate settles to a cake. This cake can be comminuted and further washed. In these above procedures, the volatile reagents used are held in the reaction mixture by using a closed reaction vessel. However, the same result can be attained by using a reaction vessel equipped with a reflux condenser.

EXAMPLE 2.—*Polyvinyl formacetaldehyde acetal resin*

50 gms. of a polyvinyl acetate (30 centipoises) were added to 20 gms. of water, 6 cc. of ethyl alcohol (95%) and 100 cc. of hydrochloric acid (sp. g. 1.18). After solution was complete, 8 gms. of trioxymethylene and 2.9 gms. of paraldehyde were added. The whole was allowed to stand at room temperature (20° C.) for 23 hours. The resin was then precipitated in hot water, washed and dried. Soluble in mixtures of ethylene chloride and methyl alcohol. This resin was converted into a clear film characterized by its resistance to tear and a satisfactory tensile strength. This resin had an acetate group content equivalent to about 5.8 percent by weight of polyvinyl acetate and a hydroxyl group content equivalent to about 13.6 percent by weight of polyvinyl alcohol. In a similar manner, a polyvinyl formaldehyde-cyclohexanone acetal resin can be prepared employing 50 gms. of polyvinyl acetate, 8 gms. of trioxymethylene and 7.4 gm. of cyclohexanone.

EXAMPLE 3.—*Polyvinyl formacetaldehyde acetal resin*

50 gms. of a polyvinyl acetate (30 centipoises) were treated exactly as in Example 2, except that 6 gms. of trioxymethylene and 5.8 gms. of paraldehyde were used. Soluble in mixtures of ethylene chloride and methyl alcohol. This resin was converted into a clear film characterized by its excellent resistance to tear.

EXAMPLE 4.—*Polyvinyl formacetaldehyde acetal resin*

50 gms. of a polyvinyl acetate (30 centipoises) were treated exactly as in Example 2, except that 4 gms. of trioxymethylene and 8.8 gms. of paraldehyde were used. Soluble in mixtures of ethylene chloride and methyl alcohol. The resin was converted into a clear film characterized by its high tensile strength. This resin had an acetate group content equivalent to about 4.9 percent by weight of polyvinyl acetate and a hydroxyl group content equivalent to about 14.1 percent by weight of polyvinyl alcohol.

EXAMPLE 5.—*Polyvinyl formacetaldehyde acetal resin*

50 gms. of a polyvinyl acetate (30 centipoises) were treated exactly as in Example 2, except that 2 gms. of trioxymethylene and 11.7 gms. of paraldehyde were used. Soluble in a mixture made up of 75% ethylene chloride and 25% methyl alcohol. This resin was converted into a clear film, the film showing rather marked susceptibility to water.

EXAMPLE 6.—*Polyvinyl formacetaldehyde acetal resin*

50 gms. of a polyvinyl acetate (45 centipoises) were treated exactly as in Example 1, except that 9 gms. of trioxymethylene and 8.8 gms. of paraldehyde were used. Soluble in ethylene chloride as well as mixtures of ethylene chloride with methyl alcohol. The resin was converted into a very thin film, characterized by its high tensile strength, high resistance to tear and low water susceptibility. This resin had an acetate group content equivalent to about 5.7 percent by weight of polyvinyl acetate and a hydroxyl group content equivalent to about 13.1 percent by weight of polyvinyl alcohol.

EXAMPLE 7.—*Polyvinyl formbenzaldehyde acetal resin*

50 gms. of a polyvinyl acetate (30 centipoises) were added to 15 cc. of water, 62 cc. of ethyl alcohol (95%) and 2 cc. of hydrochloric acid (sp. g. 1.18). The whole was digested at 70° C. until solution was complete. 6 gm. of trioxymethylene were added and digestion continued at 70° C. for about 16 hours. 13 gms. of benzaldehyde were added and digestion continued for about 48 hours at 70° C. The resin was precipitated in hot water, washed and dried. This resin is of particular use in molding. Small cups were successfully molded at 150° C. and a pressure of 10,000 lbs. per square inch. These cups were resilient and could be machined well.

EXAMPLE 8.—*Polyvinyl formbutyraldehyde acetal resin*

50 gms. of a polyvinyl acetate (30 centipoises) were treated with water, alcohol and hydrochloric acid exactly as in Example 7. When solution was complete 6 gms. of trioxymethylene were added and digestion continued at 70° C. continued for about 16 hours. 10 gms. of butyraldehyde were added and digestion continued for about 48 hours at 70° C. The resin was precipitated in hot water, washed and dried. Soluble in mixtures of ethylene chloride and methyl alcohol. This resin gave a very clear film, characterized by high resistance to tear. This resin also molded well. In a similar manner, a polyvinyl acetbutyraldehyde acetal resin can be made by condensing 50 gms. of a polyvinyl acetate (30 centipoises) and 8.8 gms. of paraldehyde and 10 gms. of butyraldehyde. This resin had an acetate group content equivalent to about 3.9 percent by weight of polyvinyl acetate and a hydroxyl group content equivalent to about 14.4 percent by weight of polyvinyl alcohol. Of the total acetal linkages 65 mole percent were butyraldehyde acetal linkages.

EXAMPLE 9.—*Polyvinyl formbutyraldehyde acetal resin*

50 gms. of a polyvinyl acetate (30 centipoises) were treated exactly as in Example 8, except that 3 gms. of trioxymethylene and 18 gms. of butyraldehyde were used. Soluble in mixtures of ethylene chloride and methyl alcohol. The resin was converted into a very clear film, characterized by its high resistance to tear. This resin had an acetate group content equivalent to about 5.1 percent by weight of polyvinyl acetate and a hydroxyl group content equivalent to about 13.8 percent by weight of polyvinyl alcohol.

EXAMPLE 10.—*Polyvinyl formchlorobutyraldehyde acetal resin*

50 gms. of a polyvinyl acetate (30 centipoises) were dissolved in 15 cc. of water, 62 cc. of ethyl alcohol (95%) and 20 cc. of hydrochloric acid (sp. g. 1.18). The whole was digested at 70° C. until solution was complete. 6 gms. of trioxymethylene were added and digestion was continued at 70° C. for about 16 hours. 10 gms. of crotonaldehyde and 18 gms. of hydrochloric acid (sp. g. 1.18) were added and digestion continued for about five and one-half hours. The resin was precipitated with hot water, washed and dried. Decomposition at melting point. Resin insoluble in most organic solvents. When an excess of hydrochloric acid was avoided a polyvinyl formcrotonaldehyde acetal resin was formed. This resin was more soluble in organic solvents.

EXAMPLE 11.—*Polyvinyl formfurfuraldehyde acetal resin*

50 gms. of a polyvinyl acetate (30 centipoises) were dissolved in 15 cc. of water, 62 cc. of ethyl alcohol (95%) and 2 cc. of hydrochloric acid (sp. g. 1.18). When solution was complete, 12 gms. of trioxymethylene and 9.6 gms. of furfuraldehyde were added and digestion at 70° C. effected for about 24 hours. The resin was precipitated in hot water, washed and dried. This resin had desirable properties, except that it developed color.

EXAMPLE 12.—*Polyvinyl formacetaldehyde acetal resin*

400 gms. of a polyvinyl acetate (30 centipoises) were added to 120 cc. of water, 496 cc. of ethyl alcohol (95%) and 16 cc. of hydrochloric acid (sp. g. 1.18). The whole was allowed to stand at room temperature until solution was complete. 72 gms. of trioxymethylene and 70.4 gms. of paraldehyde were added and the whole digested at 70° C. for 88 hours. The resin was precipitated in hot water, washed and dried. This resin was soluble in mixtures of ethylene chloride and methyl alcohol and was converted into a film of highly satisfactory physical properties. This resin molded well.

EXAMPLE 13.—*Polyvinyl formacetaldehyde acetal resin*

100 gms. of a polyvinyl acetate (45 centipoises) were added to 30 cc. of water, 124 cc. of ethyl alcohol and 4 cc. of hydrochloric acid (sp. g. 1.18). The whole was allowed to stand at room temperature until solution was complete. 18 gms. of trioxymethylene and 17.6 gms. of paraldehyde were added and the whole digested at 70° C. for 88 hours. The resin was precipitated in hot water and washed and dried. This resin was soluble in mixtures of ethylene chloride and methyl alcohol. It had the same satisfactory properties of the resin given in Example 12 and in addition had a higher melting point.

EXAMPLE 14.—*Polyvinyl formacetaldehyde acetal resin*

50 gms. of polyvinyl acetate (60 centipoises) were added to ethyl alcohol (95%) and heated on the steam bath, adding additional alcohol from time to time. When the excessively hard lumps were dissolved, the alcohol was evaporated until a heavy viscous paste remained. 20 cc. of hydrochloric acid (sp. g. 1.18) and 100 cc. of water were added and the whole allowed to stand at room temperature until a homogeneous solution was obtained. 3 gms. of paraldehyde and 8 gms. of trioxymethylene were added and allowed to stand at room temperature for 32 hours. Precipitated in hot water, washed and dried. This resin had a high melting point and was soluble in mixtures of ethylene chloride and methyl alcohol. This resin had very useful properties, but the difficulty in obtaining polyvinyl acetate of a viscosity of 60 centipoises limits its application.

EXAMPLE 15.—*Polyvinyl acet-β-hydroxy-butyraldehyde acetal resin*

10 lbs. of polyvinyl acetate (25 centipoises) were dissolved in 25 lbs. of 95% ethyl alcohol. To this solution were added 2.6 lbs. of β-hydroxybutyraldehyde (aldol), 3.8 lbs. of paraldehyde and 2.5 lbs. of hydrochloric acid (sp. g. 1.18). The resulting mixture was allowed to stand at 40° C. for about four days. At the end of this time the reaction mixture was diluted with about two volumes of 95% ethyl alcohol. The diluted reaction mixture was slowly poured into water to precipitate the resin. The resin was washed with water to remove acid and dried at 140° F. to 160° F. The resin had an acetate group content equivalent to about 2.6% by weight of polyvinyl alcohol and a hydroxyl group content equivalent to about 11.3% by weight of polyvinyl alcohol.

EXAMPLE 16.—*Polyvinyl acetaldehyde-heptaldehyde acetal resin*

344 g. of polyvinyl acetate (25 centipoises) were dissolved in 800 cc. of ethyl alcohol (95%). To this solution were added 34 g. of sulfuric acid (sp. g. 1.84) dissolved in 34 cc. of water. The mixture was heated with stirring at about 70° C. for three to four hours until incipient precipitation. At this time 88 g. of paraldehyde were added and heating at 70° C. was continued for about three hours. 35 g. of heptaldehyde were then added and heating at 70° C. continued for about three hours longer. The reaction mixture was diluted with about three times its volume of ethyl alcohol (95%). Sufficient sodium hydroxide was added to neutralize the sulfuric acid catalyst. The neutralized solution was poured into cool water to precipitate. The resin was washed thoroughly and dried. The resin had an acetate group content equivalent to about 18.8% by weight of polyvinyl acetate and a hydroxyl group content equivalent to about 10.5% by weight of polyvinyl alcohol.

EXAMPLE 17.—*Polyvinyl acetpropionaldehyde acetal resin*

20 lbs. of polyvinyl acetate (45 centipoises) were dissolved in 50 lbs. of 95% ethyl alcohol. To this solution was added 0.2 lb. of sodium nitrite dissolved in 300 cc. of a mixture of equal volumes of water and 95% ethyl alcohol. To the resulting solution, 6.4 lbs. of propionaldehyde and 8.2 lbs. of paraldehyde and 3.0 lbs. of hydrochloric acid (sp. g. 1.18) were added. The whole mixture was maintained at 40° C. for about seven days. At this time the reaction mixture was diluted with about 2.5 volumes of 95% ethyl alcohol. The resin was then precipitated by slowly pouring the diluted reaction mixture into cold water. The resin was then washed with cold water to remove acid and then was dried at 140° to 160° F. This resin contained an acetate group content equivalent to about 6.3% by weight of polyvinyl acetate and a hydroxyl group content equivalent to about 7.45% by weight of polyvinyl alcohol. The sodium nitrite is used to improve stability of the resin.

EXAMPLE 18.—*Polyvinyl acetaldehyde-propionaldehyde-butyraldehyde acetal resin*

20 lbs. of polyvinyl acetate (45 centipoises) were dissolved in 50 lbs. of ethyl alcohol (95%). To this solution was added 0.2 lb. of sodium nitrite dissolved in 300 cc. of aqueous ethyl alcohol (50%). To the resulting solution were then added, with stirring, 2.7 lbs. of propionaldehyde, 3.3 lbs. of butyraldehyde and 6.1 lbs. of paraldehyde, followed by 3 lbs. of hydrochloric acid (sp. g. 1.18). The whole mixture was allowed to stand at 40° C. for about seven days. The reaction mixture was then diluted with 3.5 times its volume of ethyl alcohol (95%). The diluted reaction mixture was poured into cool water to precipitate the resin. The resin was thoroughly washed with water and dried at 140° to 160° F. The resin had an acetate group content equivalent to about 6.4% by weight of polyvinyl acetate and a hydroxyl group content equivalent to about 7.8% by weight of polyvinyl alcohol.

EXAMPLE 19.—*Polyvinyl acetaldehyde-veratraldehyde acetal resin*

150 g. of polyvinyl acetate (25 centipoises) were dissolved in 375 cc. of ethyl alcohol (95%). To this solution were added 87 g. of veratraldehyde, 53.2 g. of paraldehyde and 37.5 g. of hydrochloric acid (sp. g. 1.18). The mixture was allowed to stand at 40° C. for about four days. The reaction mixture was diluted with one and a quarter times its volume of ethyl alcohol (95%). The diluted reaction mixture was poured into water to precipitate the resin. The resin was thoroughly washed with water and dried at 140° to 160° F. The resin contained an acetate group content equivalent to about 4.2% by weight of polyvinyl acetate and 11.0% by weight of polyvinyl alcohol. Veratraldehyde is the common name for 3,4-dimethoxybenzaldehyde.

EXAMPLE 20.—*Polyvinyl acetaldehyde-cyclopentanone acetal resin*

172 g. of polyvinyl acetate (25 centipoises) were dissolved in 500 cc. of ethyl alcohol (95%). To this solution were added 100 g. of cyclopentanone, 44 g. of paraldehyde, 3.5 g. of hydroxylamine hydrochloride and 45 cc. of hydrochloric acid (sp. g. 1.18). The mixture was allowed to stand at 40° C. for about four days. The reaction mixture was diluted with twice its volume of acetone. The diluted reaction mixture was poured into water to precipitate the resin. The resin was thoroughly washed with water and dried. The resin had an acetate group content equivalent to about 2.8% by weight of polyvinyl acetate and a hydroxyl group content equivalent to about 14.6% by weight of polyvinyl alcohol. The hydroxylamine hydrochloride is used to improve stability of the resin.

EXAMPLE 21.—*Polyvinyl acetaldehyde-furfuraldehyde acetal resin*

150 g. of polyvinyl acetate (25 centipoises) were dissolved in 375 g. of ethyl alcohol (95%). To this solution were added 66.4 g. of paraldehyde and 46.1 g. of furfuraldehyde and 37.5 g. of hydrochloric acid (sp. g. 1.18). The mixture was allowed to stand at 40° C. for about three days. The reaction mixture was diluted with twice its volume of ethyl alcohol. The diluted reaction mixture was poured into water to precipitate the resin. The resin was thoroughly washed with water and dried at 140° to 160° F. The resin contained a hydroxyl group content equivalent to about 11.2 percent by weight of polyvinyl alcohol and an acetate group content equivalent to about 3.9% by weight of polyvinyl acetate.

EXAMPLE 22.—*Polyvinyl acetfurfuraldehyde acetal resin*

150 g. of polyvinyl acetate (25 centipoises) were dissolved in 375 g. of ethyl alcohol (95%). To this solution were added 69.2 g. of paraldehyde, 16.6 g. of furfuraldehyde and 37.5 g. of hydrochloric acid (sp. g. 1.18). The mixture was allowed to stand at 40° C. for three days. The reaction mixture was diluted with twice its volume of ethyl alcohol. The diluted reaction mixture was poured into water to precipitate the resin. The resin was thoroughly washed with water and dried at 140° to 160° F. The resin contained a hydroxyl group content equivalent to about 8.6% by weight of polyvinyl alcohol and an acetate group content equivalent to about 3.9% by weight of polyvinyl acetate.

EXAMPLE 23.—*Polyvinyl acetaldehyde-benzaldehyde acetal resin*

200 g. of polyvinyl acetate (25 centipoises) were dissolved in 750 cc. of 95% ethyl alcohol. To this solution were added 52 g. (1.15 mol.) of acetaldehyde and 142 g. (1.15 mol.) of benzaldehyde and 50 g. of hydrochloric acid (sp. g. 1.18). This mixture was allowed to stand at 40° C. for about four days. At the end of this time the reaction mixture was diluted with 2.5 times its volume of 95% ethyl alcohol. The diluted reaction mixture was poured into water to precipitate the resin. The resin was thoroughly washed with water and dried. This resin had an acetate group content equivalent to about 5.6% by weight of polyvinyl acetate and a hydroxyl group content equivalent to about 13.4% by weight of polyvinyl alcohol.

EXAMPLE 24.—*Polyvinyl acetaldehyde benzaldehyde acetal resin*

25 lbs. of polyvinyl acetate were dissolved in 75 lbs. of 95% ethyl alcohol. To this solution were added 11.25 lbs. of benzaldehyde, 11.25 lbs. of paraldehyde and 6.25 lbs. of hydrochloric acid (sp. g. 1.18). The solution was allowed to stand about four days at 40° C. At the end of this time the solution was diluted with twice its volume of a 1:1 (volumes) mixture of 95% ethyl alcohol and acetic acid. The diluted reaction mixture was poured into cold water to precipitate the resin. The precipitated resin was washed with cold water and dried. The resin had a hydroxyl group content equivalent to about 9.25% by weight of polyvinyl alcohol and an acetate group content equivalent to about 2% by weight of polyvinyl acetate.

EXAMPLE 25.—*Polyvinyl butyraldehyde-benzaldehyde acetal resin*

160 g. of polyvinyl acetate (45 centipoises) were dissolved in 960 g. of 95% ethyl alcohol. To this solution were added 118 g. of benzaldehyde and 186 g. of butyraldehyde and 80 g. of hydrochloric acid (sp. g. 1.18). The resulting solution was allowed to stand for about eight days at 40° C. The reaction mixture was then diluted with about twice its volume of 95% ethyl alcohol. The diluted reaction mixture was poured into cold water to precipitate the resin. The resin was thoroughly washed with water and dried. The resin had a hydroxyl group content equivalent to about 7.4% by weight of polyvinyl alcohol and an acetate group content equivalent to about 5.65% by weight of polyvinyl acetate.

In a similar manner, employing 79.8 g. of benzaldehyde instead of 118 g. and 214 g. of butyraldehyde instead of 186 g., a resin having a hydroxyl group content equivalent to about 6.1% by weight of polyvinyl alcohol and an acetate group content equivalent to about 4.5% by weight of polyvinyl acetate was obtained.

Likewise in a similar manner, employing 158 g. of benzaldehyde instead of 118 g. and 162 g. of butyraldehyde instead of 186 g., a resin having a hydroxyl group content equivalent to about 9.8% by weight of polyvinyl alcohol and an acetate group content equivalent to about 5.5% by weight of polyvinyl acetate was obtained.

EXAMPLE 26.—*Polyvinyl acetaldehyde-isovaleraldehyde acetal resin*

172 g. of polyvinyl acetate (25 centipoises) were dissolved in 500 cc. of 95% ethyl alcohol. To this solution were added 52 g. of isovaleraldehyde and 62 g. of paraldehyde and 43 cc. of hydrochloric acid (sp. g. 1.18). The resulting solution was allowed to stand at 40° C. for about four days. The reaction mixture was then diluted with about twice its volume of 95% ethyl alcohol. The diluted reaction mixture was poured into cold water to precipitate the resin. The resin was thoroughly washed with water and dried at 50° C. for about twenty-four hours. The resin had a hydroxyl group content equivalent to about 8.7% by weight of polyvinyl alcohol and an acetate group content equivalent to about 4.0% by weight of polyvinyl acetate.

EXAMPLE 27.—*Polyvinyl acetaldehyde-isobutyraldehyde acetal resin*

210 g. of polyvinyl acetate was dissolved in 500 g. of methanol. To this solution were added 72 g. of isobutyraldehyde and 62 g. of paraldehyde and 50 cc. of hydrochloric acid (sp. g. 1.18). The resulting solution was allowed to stand for about four days at about 40° C. At the end of this time the reaction mixture was diluted with about twice its volume of 95% ethanol. The diluted reaction mixture was poured into cold water to precipitate the resin. The precipitated resin was thoroughly washed with water and dried at 50° C. for about twenty-four hours. The resin had an acetate group content equivalent to about 2.5% by weight of polyvinyl acetate and a hydroxyl group content equivalent to about 11.8% by weight of polyvinyl alcohol.

EXAMPLE 28.—*Polyvinyl acetaldehyde-2-ethylbutyraldehyde acetal resin*

172 g. of polyvinyl acetate (25 centipoises) were dissolved in 500 cc. of ethyl alcohol. To this solution were added 62 g. of paraldehyde, 60 g. of 2-ethylbutyraldehyde and 50 cc. of hydrochloric acid (sp. g. 1.18). The resulting solution was allowed to stand at 40° C. for four days. At the end of this time the reaction mixture was diluted with about twice its volume of 95% ethanol. The diluted reaction mixture was poured into cold water to precipitate the resin. The precipitated resin was thoroughly washed with water and dried at 50° C. for twenty-four hours. The resin contained an acetate group content equivalent to about 2.2% by weight of polyvinyl acetate and a hydroxyl group content equivalent to about 7.8% by weight of polyvinyl alcohol.

EXAMPLE 29.—*Polyvinyl acetaldehyde-o-chlorobenzaldehyde acetal resin*

150 parts of polyvinyl acetate (25 centipoises) were dissolved in 375 parts of 95% ethyl alcohol. To this solution were added with stirring 73 parts of o-chlorobenzaldehyde and 54 parts of paraldehyde and 37.5 parts of hydrochloric acid (sp. g. 1.18). The resulting solution was allowed to stand at about 40° C. for about 5 days. At the end of this time the reaction mixture was poured into water to precipitate the resin. The resin was thoroughly washed with water and dried at 140° to 160° F. This resin contained an acetate group content equivalent to about 2 percent by weight of polyvinyl alcohol and a hydroxyl group content equivalent to about 9 percent by weight of polyvinyl alcohol.

EXAMPLE 30.—*Polyvinyl acetaldehyde-m-nitrobenzaldehyde acetal resin*

150 parts of polyvinyl acetate (25 centipoises) were dissolved in 375 parts of 95% of ethyl alcohol. To this solution were added with stirring 79 parts of m-nitrobenzaldehyde and 54 parts of paraldehyde and 37.5 parts of hydrochloric acid (sp. g. 1.18). The resulting solution was allowed to stand at about 40° C. for about 5 days. At the end of this time the reaction mixture was poured into water to precipitate the resin. The resin was thoroughly washed with water and dried at 140° to 160° F. This resin contained an acetate group content equivalent to about 4 percent by weight of polyvinyl acetate and a hydroxyl group content equivalent to about 5 percent by weight of polyvinyl alcohol. The resins of Examples 29 and 30 are the invention of Martti Salo.

EXAMPLE 31.—*Polyvinyl acetaldehyde-chloracetaldehyde acetal resin*

107 g. of polyvinyl acetate (viscosity 30) were dissolved in 85 g. of ethyl acetate and 113 g. of 95% ethyl alcohol. To this solution was added with stirring 100 g. of the diethyl acetal of monochloracetaldehyde and 7.5 cc. of sulfuric acid dissolved in 16 cc. of water. The resulting mixture was heated at about 70° C. for about 8 hours with stirring. The reaction mixture was then cooled to ordinary temperatures and diluted with twice its volume of 1.4-dioxane, plus enough ammonium hydroxide to neutralize the sulfuric acid present. The diluted reaction mixture was then poured into well agitated cold water to precipitate the resin. The resin was thoroughly washed with cold water and then dried at about 50° C. The resin was soluble in acetone, in butyl alcohol and in chlorinated hydrocarbons. It did not disperse in methyl or ethyl alcohol. The resin contained an acetate group content equivalent to about 11 percent by weight of polyvinyl acetate and a hydroxyl group content equivalent to about 15.4 percent by weight of polyvinyl alcohol. 15 percent of the weight of the resin was due to chlorine. Resins containing chloracetaldehyde acetal groups are the inventions of Donald R. Swan (see his copending application Serial No. 248,515, filed December 30, 1938, now United States Patent 2,213,750, dated September 3, 1940). Resins of Examples 26, 27 and 28 are also the invention of Donald R. Swan (see his copending application Serial No. 262,029, filed March 15, 1939).

The rates of reaction of the various aldehydes and cyclic ketones are generally different, depending upon the natures of the aldehydes and/or cyclic ketones and the conditions employed. The only satisfactory method of determining what ratio of aldehydes and/or cyclic ketones in the reaction mixture produces a resin of desired ratio or aldehyde and/or cyclic ketone acetal groups is to carry out a test preparation, isolate and purify the resin and determine by analysis the ratio of aldehyde and/or cyclic ketone acetal groups in the resin. Generally, in our new resins, each acetal group constitutes at least about ten mole percent of the total acetal linkages.

The polyvinyl esters employed in our process can be of any desired viscosity. Polyvinyl esters of viscosities ranging from 15 to 45 are readily available.

When preparing our new resins from polyvinyl alcohols, the polyvinyl alcohol is advantageously suspended in a lower aliphatic alcohol, such as isopropyl for example, and to the suspension the aldehydes and/or cyclic ketones and acetal condensation catalyst added. Agitation of the reactants is necessary. Advantageously, however, our new resins are made from polyvinyl esters as illustrated in the above examples.

Acid deesterification catalysts are well known and any of these can be employed in our process. Mineral acids, such as hydrochloric or sulfuric acid are advantageously employed. Trichloracetic and aromatic sulfonic acids, for example, are less satisfactory because the deesterifications proceed more slowly in their presence. Acid deesterification catalysts are well known as acetal condensation catalysts. Acid reacting salts, such as aluminum and zinc chloride, for example, are also well known acetal condensation catalysts. These salts, however, are not suitable deesterification catalysts. Phosphoric acid is a well known deesterification catalyst. The quantity of deesterification and acetal condensation catalysts is important. Depending upon the nature of the catalyst, larger amounts tend to produce color in the resin.

The polyvinyl ester employed is advantageously the readily available and less costly polyvinyl acetate. Polyvinyl formate is advantageously avoided. Polyvinyl propionate or benzoate can be employed, for example. The polyvinyl ester employed need not be a simple polymer but can as well be a conjoint polymer, such as polyvinyl acetate-propionate, for example. Any polyvinyl compound having readily deesterifiable groups can be employed. When carrying out our process with a polyvinyl alcohol, any polyvinyl alcohol, such as that formed by partial or complete deesterification of a polyvinyl ester can be employed.

The polyvinyl compound used as starting material must either have a substantial proportion of ester groups which deesterify readily to give hydroxyl groups, or the starting polyvinyl compound must have a substantial proportion of hydroxyl groups to begin with.

When either a polyvinyl ester or a polyvinyl alcohol is employed, the condensation with the aldehydes and/or cyclic ketones can best be carried out in the presence of an organic solvent, such as ethyl alcohol, acetone, acetic acid or ethyl acetate. Any reaction medium which gives rise to a single homogeneous phase and hence a rapid and smooth reaction will suffice. Lower aliphatic alcohols, i. e., those having one to four carbon atoms, particularly the primary monohydric, are advantageously employed. An excess of aldehydes and/or cyclic ketones of over that required to react with the polyvinyl compound is advantageously employed.

The quantity of materials used as deesterifying medium, viz., water and/or an alcohol, as well as the quantity and nature of materials used as diluents, viz., acetone, ethyl acetate and the like, have an effect on the resins produced. In the reaction of a polyvinyl ester with a plurality of aldehydes and/or cyclic ketones, if too little water is employed the resulting resin tends to be colored. If too much water is present, the reaction mixture gives rise to a precipitate prior to the completion of the reaction.

When such precipitation occurs, the resulting substance is high in hydroxyl group content, i. e., acetalization was substantially incomplete. Such substances are not without utility, since their higher hydroxyl group content tends to make them water soluble. They can be used as dispersing, wetting or sizing agents.

The aldehydes and/or cyclic ketones employed can be the simple monomeric forms or polymeric forms. In the case of the lower aliphatic aldehydes, the polymeric forms are much more conveniently handled. The aldehydes and/or cyclic ketones can also be employed in the form of derivatives which function as the aldehydes or cyclic ketones under the conditions of the reaction. For example, acetaldehyde can be employed in the form of the diethyl acetal of acetaldehyde. If such derivatives are liquid in nature, an excess can be used, thereby providing a convenient reaction medium.

The polyvinyl alcohol or polyvinyl ester can be treated with a plurality of aldehydes and/or cyclic ketones simultaneously or the different carbonyl compounds can be added successively. We have found the properties of the resulting polyvinyl acetal resins differ according to whether the carbonyl compounds are reacted simultaneously or successively. This is especially noticeable when formaldehyde is used along with some other carbonyl compound or compounds. We have found it more satisfactory to add the formaldehyde first, allow it to react, and then add the second carbonyl compound. If desired, a third carbonyl compound can be added.

As illustrated in the above examples, these new resins can be prepared under various conditions of temperature. Where temperatures above room temperature are employed, a means for preventing the loss of the volatile solvents used must be provided. At 70° C. a reflux condenser or closed reaction vessel serves this purpose.

The mixed polyvinyl acetal resins which show satisfactory solubility in organic solvents can be converted into film or sheet as indicated in various of the above examples. This is done by dissolving about 1 part by weight of the resin in from about 4 to 5 parts by weight of a suitable organic solvent, which may be a single solvent or a mixture of solvents, and the resulting solution or "dope" is coated out to desired thinness on a film forming surface, such as a glass or metal plate or table or revolving drum. When the solvent has evaporated (this can be conveniently accelerated by means of warm air) the resulting film or sheet is stripped from the film forming surface and subjected to curing (removal of excess solvent) by heating in warm air. Of the resulting cured films or sheets, several of those made from resins illustrated above are useful as supports for light-sensitive materials, for example photographic emulsions. An example of a resin which furnishes a highly desirable support for photographic emulsions is that illustrated in Example 12.

Most of the herein described new resins are especially satisfactorily soluble in mixtures of alkylene chlorides, such as ethlyene chloride, and high percentage oxygen compounds, such as lower aliphatic alcohols, lower aliphatic ketones, lower aliphatic esters, lower aliphatic acetals, lower aliphatic ethers, dioxane, etc. From such solvents, the resin can be coated out into film or sheet and then cured.

Plasticizers can be incorporated in the resins prior to formation of the film or sheet. The following plasticizers, among others, have been found to be compatible and otherwise satisfactory: tricresyl phosphate, tributyl phosphate, tribromophenol, dibutyl phthalate, diacetin, triacetin and mono-chloronaphthalene.

The herein described new resins are suitable for many purposes other than for the manufacture of transparent film or sheet and for molding. Those resins showing satisfactory solubility in organic solvents can be made up into varnishes or lacquers with or without the addition of other resinous bodies. Almost any property desired in the permanent coating resulting from such varnishes or lacquers can be obtained by selecting a suitable mixed polyvinyl acetal resin. These new mixed polyvinyl acetal resins and, more particularly, those of lower melting points, can be successfully applied to the manufacture of laminated sheets of materials, such as glass, cellulose nitrate, cellulose acetate or wood. These new resins can also be used to impregnate fabrics, wood and the like, for the purposes of waterproofing and preservation. These new resins can also be used to insulate conductors of electricity. In the field of textiles, these resins have a wide range of utility. Those containing a high hydroxyl group content can be used as dispersing, sizing and wetting agents. The resins containing a lower hydroxyl group content can be precipitated from solution in the form of threads or sheets alone, or in conjunction with cellulose derivatives. These new resins can also be extruded into the form of film or sheet. The resulting film or sheet made by extrusion as well as by coating from solutions of the resins can be laminated and pressed into the form of heavier sheeting or boards.

Mixed polyvinyl acetal resins in which the acetal linkages are formed in part from aromatic and/or heterocyclic aldehydes and in part from aliphatic aldehydes are also described in our copending application Serial No. 187,717, filed of even date herewith.

What we claim as our invention and desire to be secured by Letters Patent of the United States is:

1. A polyvinyl acetal resin in which the acetal linkages are formed from a plurality of different aliphatic aldehyde acetal groups having not more than four carbon atoms, said resin having a hydroxyl group content equivalent to not more than about fifteen percent by weight of polyvinyl alcohol and an ester group content equivalent to not more than about ten percent by weight of polyvinyl ester.

2. A polyvinyl acetal resin in which the acetal linkages are formed from a plurality of different aliphatic aldehyde acetal groups having not more than four carbon atoms, said resin having a hydroxyl group content equivalent to not more than about fifteen percent by weight of poylvinyl alcohol and an acetate group content equivalent to not more than about five percent by weight of polyvinyl acetate.

3. A polyvinyl acetal resin in which the acetal linkages are formed from a plurality of different aliphatic aldehyde acetal groups having not more than four carbon atoms, each of said acetal groups constituting at least ten mole percent of the total acetal linkages, said resin having a hydroxyl group content equivalent to not more than about fifteen per cent by weight of polyvinyl alcohol and an ester group content equivalent to not more than about ten per cent by weight of polyvinyl ester.

4. A polyvinyl acetal resin in which the acetal linkages are formed in part from formaldehyde and in part from acetaldehyde, said resin having a hydroxyl group content equivalent to not more than about fifteen percent by weight of polyvinyl alcohol and an ester group content equivalent to not more than about ten percent by weight of polyvinyl ester.

5. A polyvinyl acetal resin in which the acetal linkages are formed in part from formaldehyde and in part from butyraldehyde, said resin having a hydroxyl group content equivalent to not more than about fifteen per cent by weight of polyvinyl alcohol and an ester group content equivalent to not more than about ten percent by weight of polyvinyl ester.

6. A polyvinyl acetal resin in which the acetal linkages are formed in part from acetaldehyde and in part from butyraldehyde, said resin having a hydroxyl group content equivalent to not more than about fifteen percent by weight of polyvinyl alcohol and an ester group content equivalent to not more than about ten percent by weight of polyvinyl ester.

7. A process of making mixed polyvinyl resins which comprises condensing a hydrolysis product of a polyvinyl ester with an amount of an aldehyde less than will combine with the hydrolysis product and when said aldehyde is substantially all combined with the hydrolysis product condensing the mass with a different aldehyde in amount in excess of that which can combine with the unreacted hydrolysis product present during said second condensation.

8. A process for preparing polyvinyl acetal resins comprising reacting a polyvinyl ester with a plurality of different aldehydes, in the presence of a deesterification medium and an acid deesterification catalyst, the reaction being carried out with all of the reactants and reaction products in solution in the deesterification medium, until there is obtained a polyvinyl acetal having an ester group content equivalent to not more than about ten percent by weight of polyvinyl ester and a hydroxyl group content equivalent to not more than about fifteen percent by weight of polyvinyl alcohol.

9. A process for preparing polyvinyl acetal resins comprising reacting a polyvinyl ester with a plurality of different aldehydes, in the presence of a deesterification medium and an acid deesterification catalyst, the aldehydes being reacted with the polyvinyl ester successively, the reaction being carried out with all of the reactants and reaction products in solution in the deesterification medium, until there is obtained a polyvinyl acetal having an ester group content equivalent to not more than about ten percent by weight of polyvinyl ester and a hydroxyl group content equivalent to not more than about fifteen percent by weight of polyvinyl alcohol.

10. A process for preparing polyvinyl acetal resins comprising reacting a polyvinyl ester with formaldehyde and with another aldehyde, in the presence of a deesterification medium and an acid deesterification catalyst, the formaldehyde being reacted substantially completely before the other aldehyde is reacted, the reaction being carried out with all of the reactants and reaction products in solution in the deesterification medium, until there is obtained a polyvinyl acetal having an ester group content equivalent to not more than about ten percent by weight of polyvinyl ester and a hydroxyl group content equivalent to not more than about fifteen per cent by weight of polyvinyl alcohol.

11. A process for preparing polyvinyl acetal resins comprising reacting a polyvinyl acetate with a plurality of different aldehydes, in the presence of a deesterification medium, a deesterification catalyst and an acetal condensation catalyst, the reaction being carried out with all of the reactants and reaction products in solution in the deesterification medium, until there is obtained a polyvinyl acetal having an acetate group content equivalent to not more than about ten percent by weight of polyvinyl acetate and a hydroxyl group content equivalent to not more than about fifteen percent by weight of polyvinyl alcohol.

12. A process for preparing polyvinyl acetal resins comprising reacting a polyvinyl acetate with a plurality of different aldehydes, in the presence of a deesterification medium and an acid deesterification catalyst, the reaction being carried out with all of the reactants and reaction products in solution in the deesterification medium, until there is obtained a polyvinyl acetal having an acetate group content equivalent to not more than about ten percent by weight of polyvinyl acetate and a hydroxyl group content equivalent to not more than about fifteen percent by weight of polyvinyl alcohol.

JAMES G. McNALLY.
RUSSEL H. VAN DYKE.